United States Patent
De Gaillard et al.

(10) Patent No.: US 10,710,704 B2
(45) Date of Patent: Jul. 14, 2020

(54) FAIRING RING FOR A BLADED WHEEL

(71) Applicant: SAFRAN AIRCRAFT ENGINES, Paris (FR)

(72) Inventors: Thomas Alain De Gaillard, Moissy-Cramayel (FR); Alexandre Bernard Marie Boisson, Moissy-Cramayel (FR); Claire Marie Figeureu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 14 days.

(21) Appl. No.: 16/312,582

(22) PCT Filed: Jun. 22, 2017

(86) PCT No.: PCT/FR2017/051662
§ 371 (c)(1),
(2) Date: Dec. 21, 2018

(87) PCT Pub. No.: WO2017/220940
PCT Pub. Date: Dec. 28, 2017

(65) Prior Publication Data
US 2019/0161166 A1 May 30, 2019

(30) Foreign Application Priority Data

Jun. 22, 2016 (FR) ..................................... 16 55799

(51) Int. Cl.
*F04D 29/32* (2006.01)
*B64C 11/14* (2006.01)
(Continued)

(52) U.S. Cl.
CPC .............. *B64C 11/14* (2013.01); *F01D 5/066* (2013.01); *F01D 11/008* (2013.01);
(Continued)

(58) Field of Classification Search
None
See application file for complete search history.

(56) References Cited

U.S. PATENT DOCUMENTS 4,569,629 A * 2/1986 Ferris ...................... B64C 27/32
416/134 A
5,205,715 A * 4/1993 Perry ...................... B64C 23/06
416/228
(Continued)

FOREIGN PATENT DOCUMENTS

| FR | 2918409 A1 | 1/2009 |
| FR | 3010442 A1 | 3/2015 |

OTHER PUBLICATIONS

International Search Report dated Oct. 9, 2017, in PCT/FR2017/051662, filed Jun. 22, 2017.
(Continued)

*Primary Examiner* — Michael Lebentritt
(74) *Attorney, Agent, or Firm* — Oblon, McClelland, Maier & Neustadt, L.L.P.

(57) ABSTRACT

A fairing ring for a bladed wheel is disclosed. The fairing ring includes an annular wall extending axially, the wall presenting a plurality of notches extending axially, each notch being configured to receive a leading edge or a trailing edge of a blade.

9 Claims, 3 Drawing Sheets

(51) Int. Cl.
  *F01D 5/06*   (2006.01)
  *F01D 11/00*  (2006.01)
  *F04D 29/02*  (2006.01)

(52) U.S. Cl.
  CPC ......... *F04D 29/023* (2013.01); *F04D 29/321* (2013.01); *F05D 2220/36* (2013.01); *F05D 2240/30* (2013.01); *F05D 2240/303* (2013.01); *F05D 2240/80* (2013.01); *F05D 2250/283* (2013.01); *F05D 2300/10* (2013.01); *F05D 2300/518* (2013.01); *F05D 2300/603* (2013.01)

(56) References Cited

U.S. PATENT DOCUMENTS

| | | | | |
|---|---|---|---|---|
| 5,372,071 | A * | 12/1994 | Richards | B64G 1/641 |
| | | | | 102/378 |
| 6,168,379 | B1 * | 1/2001 | Bauer | B64C 27/001 |
| | | | | 244/215 |
| 6,270,308 | B1 * | 8/2001 | Groppel | F03D 3/0472 |
| | | | | 415/4.3 |
| 9,623,966 | B1 * | 4/2017 | van der Westhuizen | |
| | | | | B64C 27/18 |
| 2011/0037233 | A1 | 2/2011 | Harper | |
| 2015/0267545 | A1 | 9/2015 | Merlot et al. | |
| 2016/0177761 | A1 * | 6/2016 | Huizenga | F01D 9/047 |
| | | | | 415/209.3 |

OTHER PUBLICATIONS

Chinese Office Action issued in Chinese Patent Application No. 2017800391863 dated Apr. 2, 2020 (w/ English Translation).

* cited by examiner

FAIRING RING FOR A BLADED WHEEL

FIELD OF THE INVENTION

The invention relates to a fairing ring for a bladed wheel, to a bladed wheel fitted with such a fairing ring, and to a turbomachine fitted with such a bladed wheel. In particular, the bladed wheel may be a turbojet fan, but not limited thereto.

STATE OF THE PRIOR ART

Structures for defining in leaktight manner the passage for gas at the blade roots within a bladed wheel generally comprise an inter-blade platform and a gasket carried by each platform and in contact with the blades, in particular at the leading edges and at the trailing edges of the blades. Such a structure is described in Document FR 2 987 086.

Nevertheless, sealing at the leading edges and/or at the trailing edges of the blades, where geometrical shapes are particularly complex, could still be improved. There thus exists a need in this sense.

SUMMARY OF THE INVENTION

An embodiment provides a fairing ring for a bladed wheel, the fairing ring comprising an annular wall extending axially, said wall presenting a plurality of notches extending axially, each notch being configured to receive a leading edge or a trailing edge of a blade.

The term "extending axially" is naturally used to mean that the element in question extends strictly parallel to the axial direction, or indeed at an angle of less than 45° relative to the axial direction. Thus, in the meaning of the present disclosure, a frustoconical annular wall is said to "extend axially".

It can be understood that the ring extends in an axial direction, a radial direction, and a circumferential direction. In general manner, the axial direction corresponds to the direction of the axis of rotation of the bladed wheel (or the direction of the axis of the fairing ring), and a radial direction is a direction perpendicular to the axial direction. The circumferential direction corresponds to the direction describing a ring around the axial direction. The axial radial and circumferential directions correspond respectively to the directions defined by the height, the radius, and the angle of a cylindrical coordinate system.

It can also be understood that all of the notches are placed on the same side of the ring when considered in the axial direction.

Thus, by placing the ring around the leading edges or around the trailing edges of the blades of the bladed wheel, with each leading edge or trailing edge being received in a notch, a gas passage is defined reliably without leakage being possible between each blade and the fairing ring, either at the inlet or the outlet of the bladed wheel. Naturally, the leading edges of the blades are beside the (upstream) inlet of the bladed wheel, while the trailing edges of the blades are placed beside the (downstream) outlet of the bladed wheel.

In some embodiments, each notch presents the shape of the profile of a leading edge or of a trailing edge of a blade.

A notch of such a shape enables the ring to fit as closely as possible to the shape of the blades, thereby improving sealing.

In some embodiments, the inter-notch portions are made of composite material, while the remainder of the ring is made of metal material.

It should be understood that a composite material is an assembly of at least two different materials that are not miscible, while a metal material is a metal or a metal-based alloy.

Naturally, the inter-notch portions are the portions of the ring that extend between two adjacent notches. For example, the inter-notch notches are made of polyurethane foam or of a honeycomb structure having a cellular body made of aluminum or of poly(m-phenyleneisophthalamide) (also known under the generic trade name Nomex®) covered in a layer (or skin) that is made of metal (e.g. of titanium or of aluminum) or of carbon fiber composite material. By way of example, the remainder of the ring is made of titanium or of aluminum.

When a blade deforms, e.g. as a result of ingesting a solid element (e.g. a bird), it may come into contact against an inter-notch portion and it may deform that inter-notch portion in the circumferential direction. This contact serves to off-load the blade and limit any deflection of the blade, thereby limiting potential damage to the blade. Furthermore, for events that are more critical, such as ingesting a heavy bird or losing a blade, that contact is no longer sufficient for limiting damage to the blade. Under such circumstances, allowing for plastic deformation of the inter-notch portions serves to dissipate energy from the blade to the inter-notch portions, thereby limiting damage to the blade. Such a combination of composite material for the inter-notch portions and metal material for the remainder of the ring enables the designer to adjust exactly the stress thresholds from which the inter-notch portions deform plastically (i.e. the plasticity threshold).

In some embodiments, each inter-notch portion is configured to deform plastically when subjected to a circumferential force that is greater than or equal to 40 kN±30% (forty kilo-newtons plus or minus thirty percent).

This ensures that beyond a certain predetermined imposed movement that generates such a circumferential force, the inter-notch portion adjacent to a blade that is deforming with a large amplitude itself deforms plastically. This enables this inter-notch portion to perform an energy dissipation function, thereby dissipating the energy resulting from the blade deforming and limiting the amplitude of deformation of the blade. This serves to limit the propagation of deformation within the blade.

In some embodiments, the fairing ring includes at least one wear portion configured to be placed facing a blade.

It can be understood that a wear portion is a portion that is configured to wear to the benefit of another portion in contact therewith, specifically a blade. Naturally, a wear portion is generally mounted in removable manner so that it can be replaced when the wear of the wear portion becomes excessive. For example, a gasket may constitute a wear portion.

By way of example, the surfaces of the ring that define the notches are fitted with respective wear portions. By means of such a wear portion, it is possible to mount the fairing ring in contact with the leading edges or the trailing edges of the blades, thereby maximizing sealing, while the wear portions ensure the integrity of the blades by wearing in use.

In some embodiments, the fairing ring includes an annular wall extending radially and configured to mount said fairing ring on a disk of the bladed wheel.

Such a radial annular wall enables all of the means used for mounting the fairing ring on a bladed wheel, e.g. holes, tapping, hooks, etc., to be offset to a portion of the ring that is not used for defining a gas passage. This enables better sealing to be ensured.

In some embodiments, the fairing ring is configured to be fitted with an inlet cone or an outlet cone of the bladed wheel.

Such an inlet or outlet cone for the bladed wheel serves to guide the gas stream and the inlet or the outlet of the wheel.

An embodiment also provides a bladed wheel fitted with at least one fairing ring in accordance with any of the embodiments described in the present disclosure.

For example, the bladed wheel comprises a disk having a plurality of blades mounted at its periphery together with a plurality of inter-blade platforms, the inter-blade platforms being configured to leave the leading edges and/or the trailing edges of the blades free. Thus, the fairing ring fits closely to the leading edges and/or the trailing edges (the bladed wheel may have a single fairing ring placed at the inlet or the outlet of the wheel, or else two fairing rings, one placed at the inlet and the other at the outlet of the wheel). Thus, the leading edges and/or the trailing edges are received in the notches of the ring, while the axial ends of the inter-notch portions of the ring co-operate with the corresponding axial ends of the inter-blade platforms.

In some embodiments, the inter-notch portions of the fairing ring extend over not more than 15% of the axial length of the blades.

The length of the blades is measured in projection into the axial direction. By configuring the notches so that the blades are received over 15% of their length from their leading or trailing edges, it is ensured that the fairing ring covers the portions of the blades that present the most complex shapes, where it is the most difficult to provide sealing. Such a configuration thus serves to optimize sealing between the blades and the fairing ring.

An embodiment also provides a turbomachine fitted with a bladed wheel in accordance with any of the embodiments described in the present disclosure.

Such bladed wheels are particularly suitable for use within a turbomachine. For example, an embodiment provides a turbojet and said bladed wheel constitutes the fan of such turbojet.

BRIEF DESCRIPTION OF THE DRAWINGS

The invention and its advantages can be better understood on reading the following detailed description of various embodiments of the invention given as non-limiting examples. The description refers to the accompanying sheets of figures, in which.

DETAILED DESCRIPTION OF EMBODIMENTS

Figure 1:
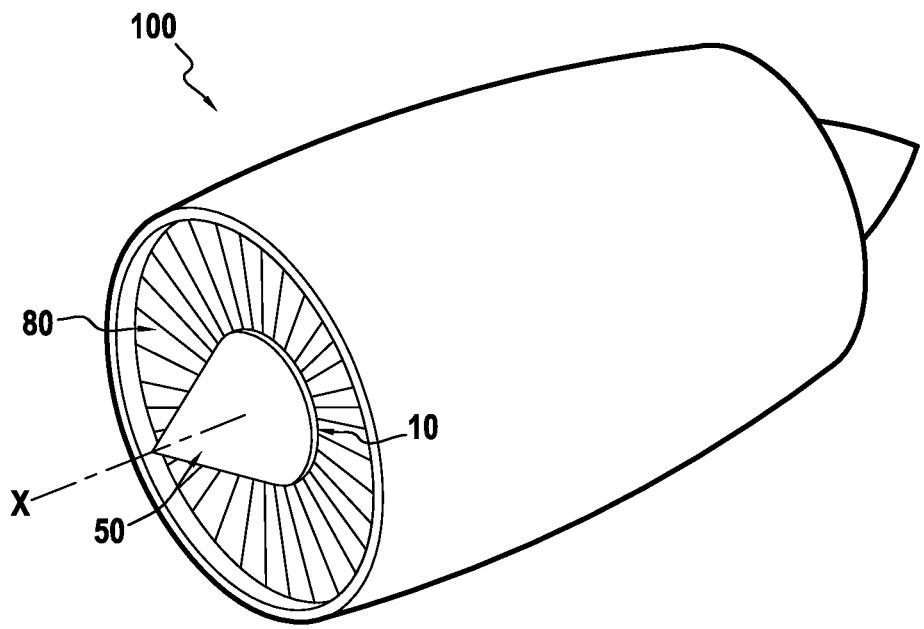
FIG. 1 shows a turbojet having a fan.
Figure 2:
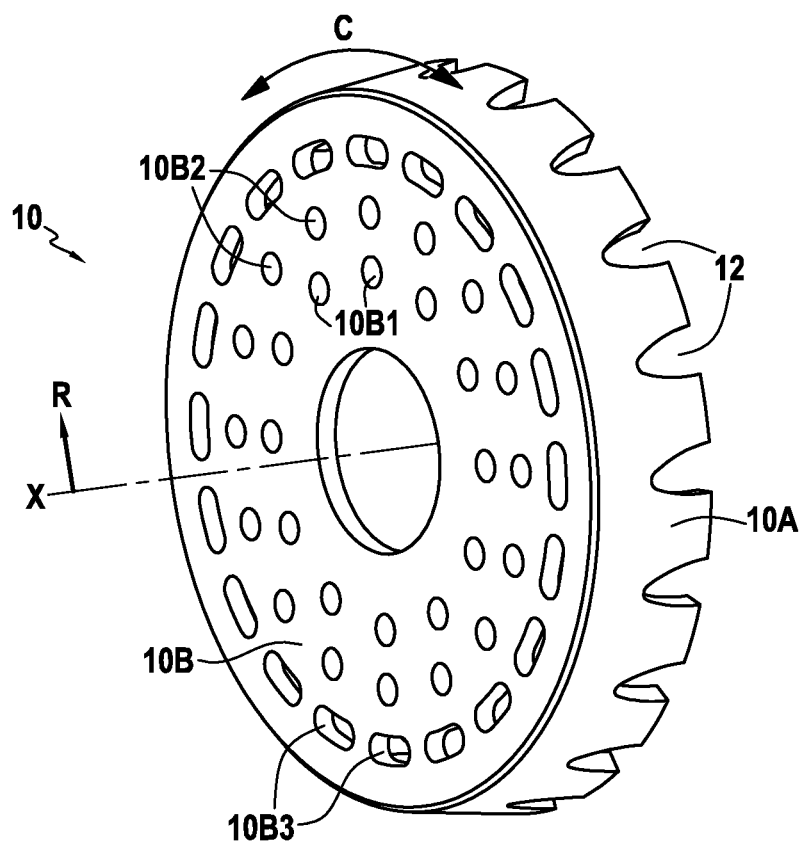
FIG. 2 shows a fairing ring fitted to the fan of the FIG. 1 turbojet.

FIG. 1 shows a turbomachine 100, specifically a turbojet 100, having a bladed wheel 80, specifically a fan 80, that is fitted at its inlet with a fairing ring 10 having an inlet cone 50 mounted thereon.

The fairing ring 10 extends in an axial direction X, a radial direction R, and a circumferential direction C. The ring 10 presents an axially extending annular wall 10A (or axial wall 10A) having a plurality of notches 12 formed therein. The ring 10 also presents a radially extending annular wall 10B (or radial wall 10B). Naturally, the axial wall 10A may form an angle lying in the range 0° to 45° with the axial direction X, while the radial wall 10B may form an angle lying in the range 45° to 90° with the axial direction X.

The radial wall 10B presents a first series of fastener holes 10B1 for fastening the ring 10 to the disk of the fan 80. The radial wall 10B presents a second series of fastener holes 10B2 for fastening the cone 50 on the ring 10. Finally, the radial wall 10B presents a third series of holes 10B3 that are oblong. These holes 10B3 are provided to lighten the ring 10.

Figure 3:
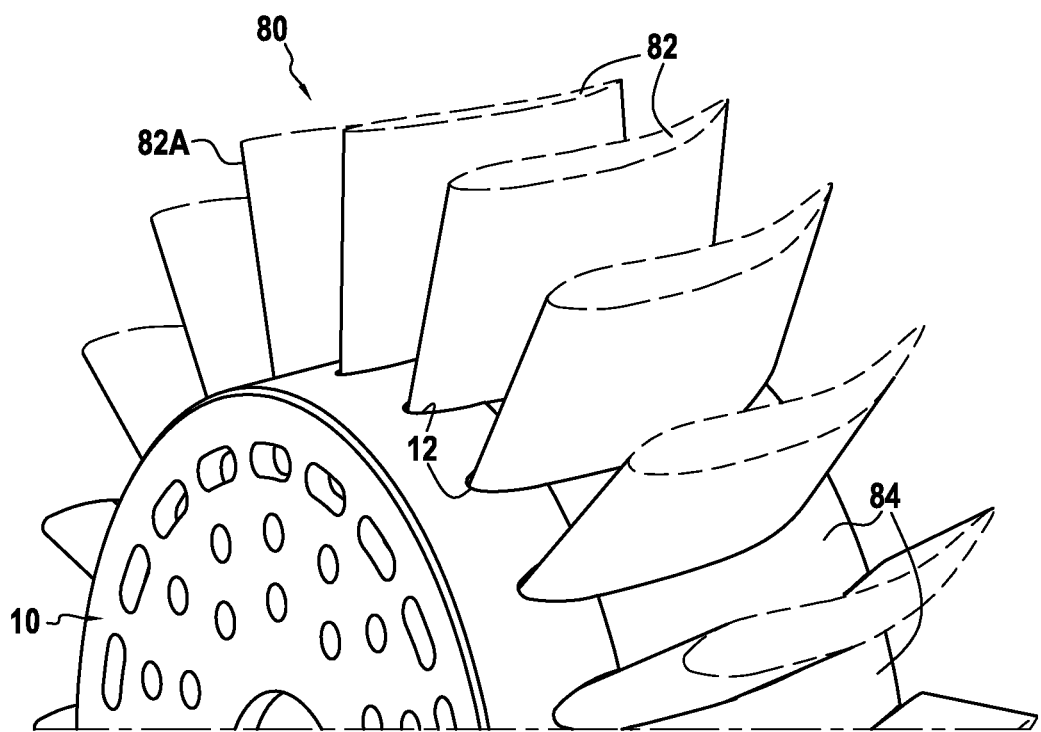
FIG. 3 is a fragmentary perspective view of the fan of the FIG. 1 turbojet fitted with the FIG. 2 fairing ring.

All of the notches 12 are formed on the same side of the ring 10 in the axial direction X. Each notch 12 presents the shape of the profile of the leading edges 82A of the blades 82 of the fan 80. As can be seen in FIG. 3, each notch 12 receives the leading edge 82A of a blade 82.

Figure 4:
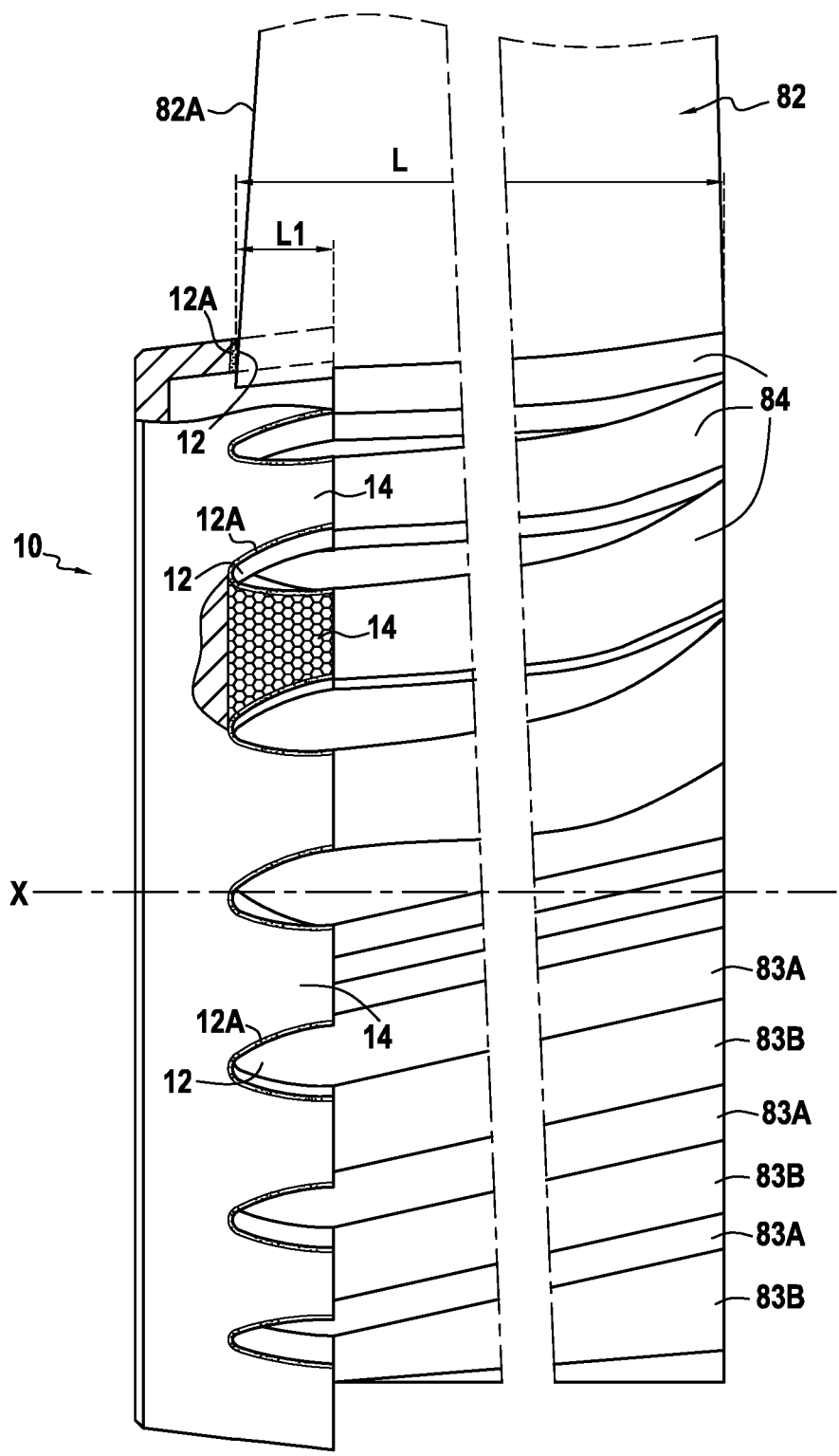
FIG. 4 is a side view of the fan while partially assembled.

As shown in FIG. 4, the fairing ring 10 is mounted on a disk 83 of the fan 80, the disk having the blades 82 mounted at its periphery, with the blades 82 being inserted in slots 83A configured to receive the roots of the blades 82, inter-blade platforms 84 also being mounted at the periphery of the disk, these inter-blade platforms 84 being mounted on teeth 83B of the disk 83.

In this example, the fairing ring 10 co-operates axially in contact with the inter-blade platforms 84 so as to define a gas passage in continuous manner between the blades 82 at the roots of the blades 82. More particularly, in this example, the portions of the wall 10A of the ring 10 that extend between the notches 12 form inter-notch portions 14, while the axial ends of the inter-notch portion 14 are in contact with the facing axial ends of the inter-blade platforms 84.

The axial length L1 of the inter-notch portions 14 in this example is about 8% of the axial length L of the blades 82. Thus, in general manner, the inter-notch portions 14 extend at most over 15% of the axial length L of the blades 82.

Furthermore, the surfaces of the inter-notch portions 14 defining each of the notches 12, which surfaces are placed facing the blades 82, and more particularly the leading edges 82A of the blades 82, present wear portions 12A in contact with the blades 82.

As can be seen on the inter-notch portion 14 that is shown cut away, each inter-notch notch 14 presents a honeycomb internal structure made of poly(m-phenyleneisophthalamide) covered by a metal covering, which in this example is made of titanium. The remainder of the ring 10 is made of metal, in this example of titanium.

Although the present invention is described with reference to specific embodiments, it is clear that modifications and changes may be undertaken on those examples without going beyond the general scope of the invention as defined by the claims. In particular, individual characteristics of the various embodiments illustrated and/or shown may be combined in additional embodiments. Consequently, the description and the drawings should be considered in a sense that is illustrative rather than restrictive.

The invention claimed is:

1. A fairing ring for a bladed wheel, the fairing ring comprising:
    an annular wall extending axially, said wall presenting a plurality of notches extending axially, each notch being configured to receive a leading edge or a trailing edge of a blade,
    wherein inter-notch portions are made of composite material, the composite material being an assembly of at least two different materials that are not miscible, while a remainder of the ring is made of metal material, the metal material being a metal or a metal-based alloy.

2. A fairing ring according to claim 1, wherein each notch presents a shape of a profile of a leading edge or of a trailing edge of a blade.

3. A fairing ring according to claim 1, wherein each inter-notch portion is configured to deform plastically when subjected to a circumferential force that is greater than or equal to 40 kN±30%.

4. A fairing ring according to claim 1, including at least one wear portion configured to be placed facing a blade.

5. A fairing ring according to claim 1, including an annular wall extending radially and configured to mount said fairing ring on a disk of the bladed wheel.

6. A fairing ring according to claim 1, configured to be fitted with an inlet cone or an outlet cone of the bladed wheel.

7. A bladed wheel fitted with a fairing ring according to claim 1.

8. The bladed wheel according to claim 7, wherein the inter-notch portions of the fairing ring extend over not more than 15% of an axial length of the blades.

9. A turbomachine including the bladed wheel according to claim 7.

* * * * *